No. 799,556. PATENTED SEPT. 12, 1905.
A. J. GILLESPIE.
REGISTER OR COUNTER.
APPLICATION FILED FEB. 12, 1900. RENEWED FEB. 7, 1905.
3 SHEETS—SHEET 1.
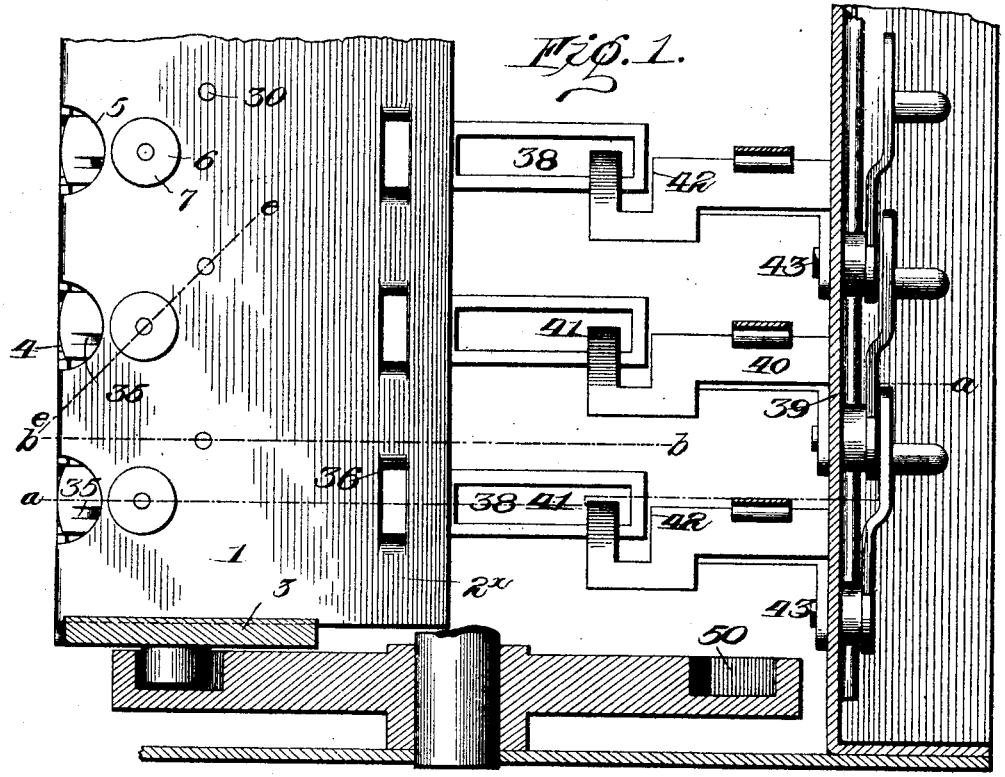
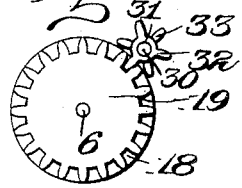
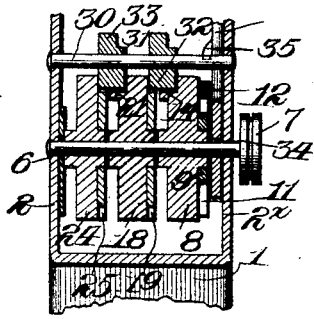
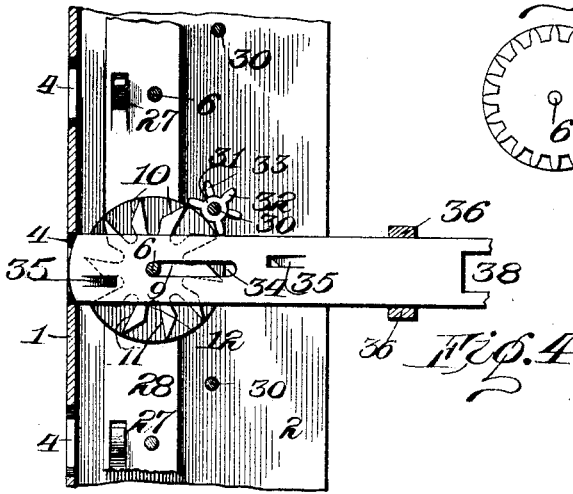
Witnesses:
Walter B. Payne.
G. Willard Rich.
Inventor:
Alfred J. Gillespie
by Church & Church
his Attorneys.

No. 799,556. PATENTED SEPT. 12, 1905.
A. J. GILLESPIE.
REGISTER OR COUNTER.
APPLICATION FILED FEB. 12, 1900. RENEWED FEB. 7, 1905.
3 SHEETS—SHEET 2.
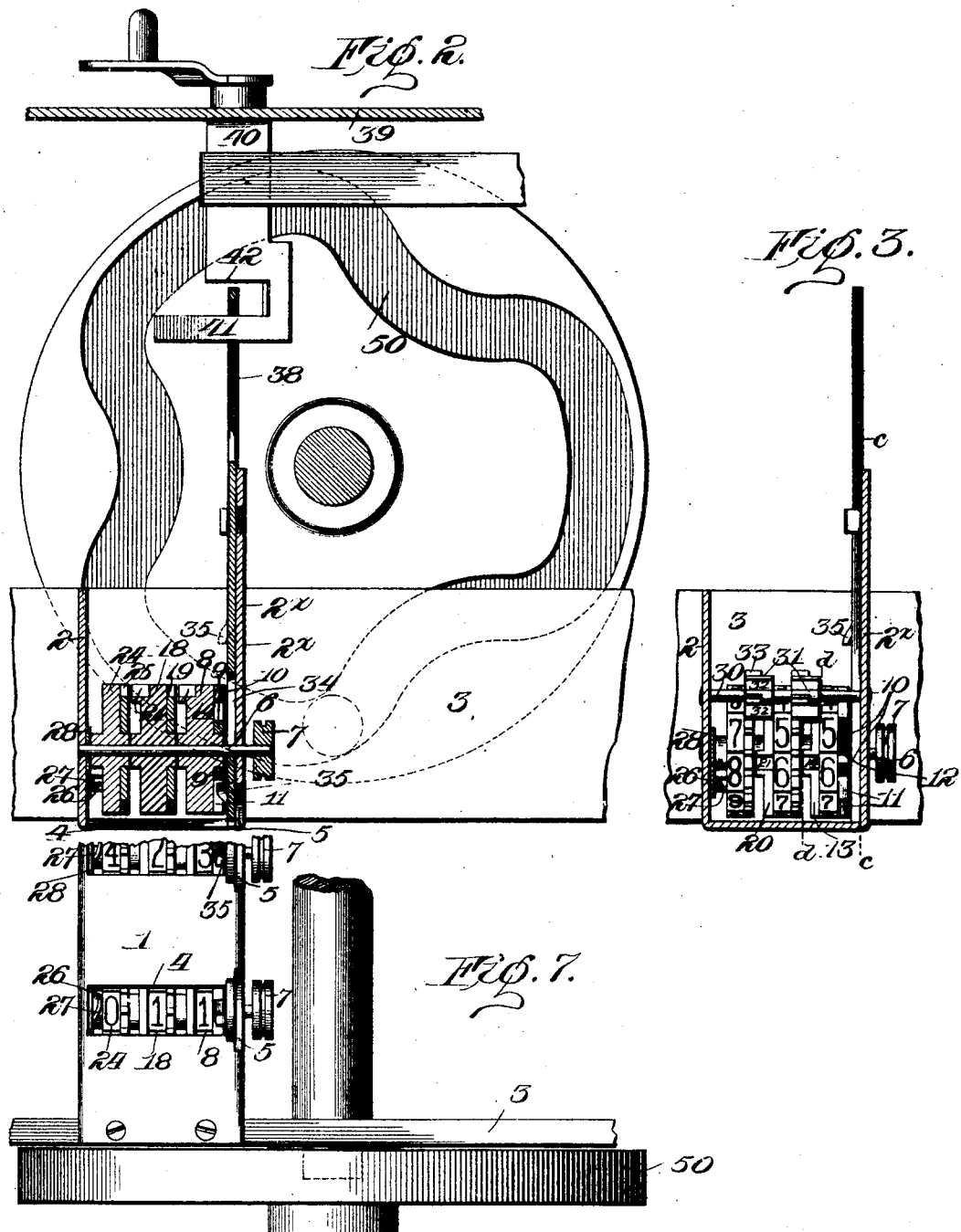
Witnesses:
Walter B. Payne.
G. Willard Rich.
Inventor,
Alfred J. Gillespie
by Church & Church
his Attorneys.

No. 799,556. PATENTED SEPT. 12, 1905.
A. J. GILLESPIE.
REGISTER OR COUNTER.
APPLICATION FILED FEB. 12, 1900. RENEWED FEB. 7, 1905.
3 SHEETS—SHEET 3.
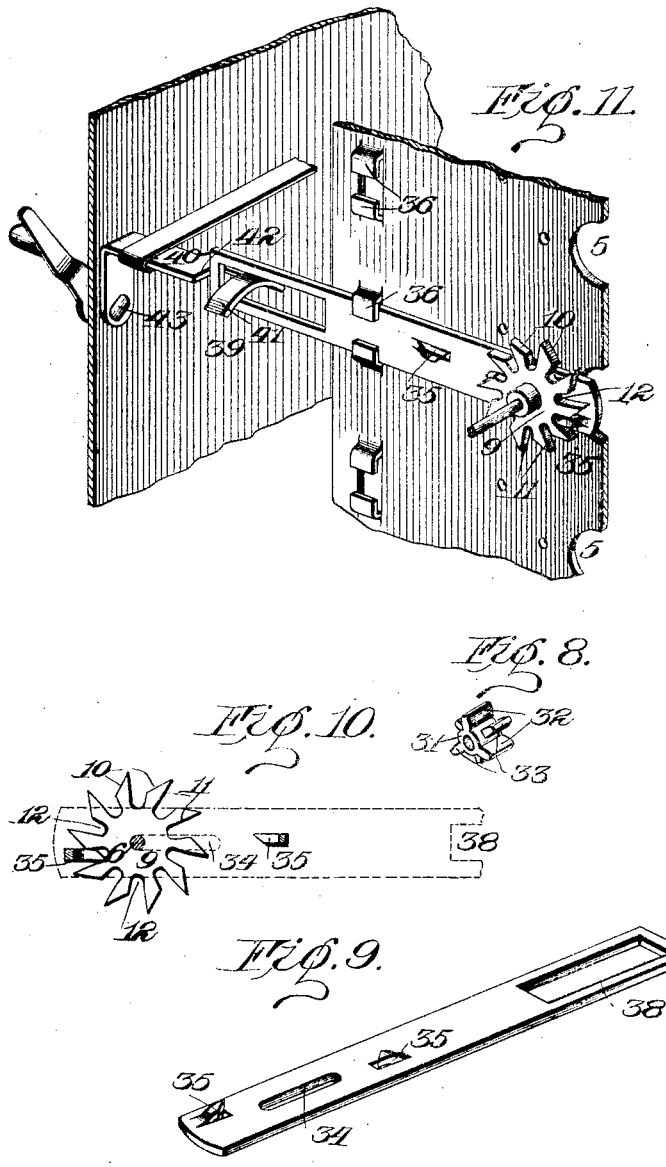
Witnesses:
Walter B. Payne.
G. Willard Rich.
Inventor,
Alfred J. Gillespie
by Church & Church
his Attorneys.

UNITED STATES PATENT OFFICE.

ALFRED J. GILLESPIE, OF ROCHESTER, NEW YORK, ASSIGNOR, BY MESNE ASSIGNMENTS, TO U. S. STANDARD VOTING MACHINE COMPANY, OF ROCHESTER, NEW YORK, A CORPORATION OF NEW YORK.

REGISTER OR COUNTER.

No. 799,556.      Specification of Letters Patent.      Patented Sept. 12, 1905.

Original application filed November 18, 1897, Serial No. 658,738. Divided and this application filed February 12, 1900. Renewed February 7, 1905. Serial No. 244,555.

*To all whom it may concern:*

Be it known that I, ALFRED J. GILLESPIE, of Rochester, in the county of Monroe and State of New York, have invented a certain new and useful Improvement in Registers or Counters; and I do hereby declare the following to be a full, clear, and exact description of the same, reference being had to the accompanying drawings, forming a part of this specification, and to the reference-numerals marked thereon.

My present invention has for its object to provide an improved register or counter and actuating devices therefor adapted particularly for use in voting-machines of the type of that shown in Letters Patent No. 628,792, granted to me July 11, 1899, although capable of use in other connections and for other purposes; and it consists in certain improvements and combinations of parts hereinafter fully described, the novel features being pointed out in the claims at the end of this specification.

In the accompanying drawings, Figure 1 is a side elevation of a register-casing embodying a plurality of registers and operating devices; Fig. 2, a horizontal sectional view on the line $a\,a$ of Fig. 1, showing the register-casing in section; Fig. 3, a horizontal sectional view on the line $b\,b$ of Fig. 1; Fig. 4, a sectional view on the line $c\,c$ of Fig. 3; Fig. 5, a sectional view on the line $d\,d$ of Fig. 3; Fig. 6, a sectional view on the line $e\,e$ of Fig. 1; Fig. 7, a rear elevation of the register-casing; Fig. 8, a perspective view of one of the transferring-pinions; Fig. 9, a perspective view of one of the counter-actuators; Fig. 10, a side view of the actuating-wheel, showing the coöperation of the pallets on the actuator with said wheel; Fig. 11, a perspective view showing the actuator, the member coöperating therewith, and actuating-wheel of the register.

Similar reference-numerals in the several figures indicate similar parts.

The main casing or frame 1 of the register is preferably composed of a single piece of sheet metal formed into a channel, as shown, embodying the two rearwardly-extending side flanges 2 $2^{\times}$, the latter being the longer and serving to form a support for the actuator. This frame, which is adapted to contain a series of registers, as will be explained, is attached to any suitable supporting-frame 3.

The rear portion of the casing 1 is provided with a series of apertures 4 for the inspection of the figures upon the wheels of the register and is also provided with a recess or cut-away portion 5 for permitting grasping the end of the actuator, as will be described. As all of the registers mounted in the casing are precisely the same, a description of one will suffice.

Extending between the sides of the casing is an arbor or spindle 6, arranged to turn freely in apertures therein and having an operating head or button 7 on the outer free end. Secured rigidly to this arbor or spindle is the units-wheel 8 of the register, having the figures from "0" to "9" on its periphery and adapted to be exposed through the aperture 4 in the casing. Secured to or formed upon one side of this units-wheel is a toothed actuating-wheel 9, as shown in Figs. 10 and 11, the sides of the teeth of said wheel being substantially radial, while the outer faces 10 are curved or inclined at an acute angle relative to the face 11, as shown.

At the base of the teeth are provided recesses 12 for the reception of the pallets of the actuator, the sides of said recess being substantially parallel with the line of movement of the actuator, so that said pallets when in the recess may serve to lock the wheel, and also they are deep enough to permit a slight motion of the actuator and wheel relatively in the direction of the length of the actuator without unlocking, as will be presently explained. Upon the opposite side of the units-wheel from the toothed actuating-wheel it is provided with a substantially smooth periphery 13 and at one point provided with a laterally-projecting recessed lug or projection 14. The units-wheel in the present form of counter is rigidly secured to the arbor 6.

18 indicates the tens-wheel loosely mounted upon the shaft or arbor 6, having figures at its periphery and on the side next the units-wheel is provided with a gear-wheel 19 and on its opposite side a smooth surface or periphery 20 and recessed lug or projection 21, similar to that upon the units-wheel.

24 indicates the hundreds-wheel (in the present instance being the last wheel of the train) having the gear-wheel 25 on the side next the tens-wheel and upon its other side a stop or projection 26, adapted to coöperate with a spring detent or stop for arresting said wheel with the zero indication thereon in line with the aperture 4 in the casing when the wheel is turned backward, but adapted to yield and permit the wheel to continue its forward motion and make several complete revolutions, if desired. This spring finger or detent is indicated by 27 and is preferably stamped from a piece of sheet metal 28, arranged at the side of the casing and through which the arbor 6 passes, said plate preferably extending vertically in the casing and having fingers coöperating with several of the register-wheels inasmuch as I purpose providing several of the registers in a single vertically-extending casing.

30 indicates an arbor mounted in the sides of the casing extending parallel with the arbor 6 and having loosely arranged upon it two transferring-gears 31, each provided with alternately and laterally-extending long and short teeth 32 and 33, respectively. The transferring-gears are arranged between the units and tens and also between the tens and hundreds wheels or disks, the ends of adjacent long teeth normally resting upon the smooth surface 13 and 20 at the sides of the wheels of lower denomination, thus locking the latter during the greater portion of their rotation, while the shorter teeth and also the left-hand end of the long teeth engage with the gears on the adjacent wheels and with the sides of the lugs 21, which operate as segmental gears. When the numeral "9" on one of the wheels of lower denomination passes from in front of one of the exposing-apertures 4, the projection 21 engages the short tooth of the transferring-wheel, rotates the latter, and moves the next adjacent higher wheel a distance sufficient to expose the next higher numeral, as usual in registers of this general construction.

The register-actuator is preferably constructed, as shown in Figs. 9 and 11, of a single plate of sheet metal formed with the aperture 34 and the two pallets 35 struck up from the same side on opposite sides of the aperture and pointed in opposite directions, as shown. The aperture 34 is for the accommodation of the arbor 6, so that the actuator may reciprocate longitudinally in suitable guides, the guide for one end being formed in the present instance by ears or lugs 36, struck out of the casing-plate 2ˣ, and the guide for the other end being formed by the aperture 4 in the casing-plate, through which the actuator passes. A small recess or cut-away portion 5 is formed at the side of the aperture 4 to permit a person to grasp the end of the actuator, if desired.

From the above construction of the actuator and units-wheel it will be seen that when the actuator is in the position shown in Fig. 11 the outer pallet is in the locking-recess 12 between the bases of two of the teeth on the actuating-wheel and movement of the latter is prevented, and when the actuator is moved relatively in the opposite direction the inclined surface of the other pallet thereon will engage the inclined or curved face of the opposite tooth on the wheel and turn the wheel one-twentieth of a revolution, (in case the wheels are numbered in tens,) holding it locked in this position as before, as shown in Fig. 10. The rotation of the wheel is completed by the return of the actuator to normal or first-described position, the inclined portion of the outer pallet then engaging the inclined face of the wheel-tooth on the opposite side of the arbor.

The relative movements of the register and actuator may be caused by any suitable means; but I prefer to employ a device consisting of a member 40, mounted upon a support or plate 39 and embodying a finger 41, normally projecting into a slot 38 in the actuator, and a relatively short abutment 42, adapted to be moved into alinement with the outer end of the actuator. One of these operating devices is employed for each register-actuator, and in the present embodiment of the invention the plate 40 is pivoted at 43, and the finger 41 is curved on an arc struck from the pivotal center; but this particular construction is immaterial and could be changed, if desired, and the plate 40 moved in a horizontal or vertical plane. The support 39 and register-casing are relatively movable toward and from each other, so that when the plate or member 40 is turned or moved to bring the abutment 42 in line with the end of the actuator, as in full lines in Fig. 2, and then the support and register-casing operated toward each other the palleted wheel of the register will be operated a partial rotation and locked, and when they are separated the finger 41, engaging the end of the slot in the actuator, will move the latter in the opposite direction, irrespective of the relative position of the abutment 42, completing the movement of the register and locking it from operation while the parts are in this position and, indeed, while they are in either poition.

Any suitable means could be provided for causing the relative movements of the supports 39 and the frame carrying the registers—such, for instance, as a rotary cam 50, operating upon a projection at the lower end of the support for the register-casing, the support 39 in this arrangement being stationary—or, if desired, the support 39 could be movable and the register-frame stationary.

When it is desired to return the numeral-wheels of the register to normal position and bring the zero indications thereon in line with the apertures 4 in the casing, it is only necessary to place the actuators in central position, with both pallets out of the path of the teeth on the actuating-wheel, and then by means of the thumb-nuts 7 rotate the arbor 6 backward, the transferring-gears between the wheels communicating motion positively from one to the other until first the hundreds-wheel or the one of the highest denomination is set and is arrested by the spring-detent 27, and then the other wheels will be arrested serially, with the zero indications thereon in line with the openings 4. By employing sheet material in the construction of the registers, as described, a considerable economy is effected, and the parts are lightened and may readily be assembled by unskilled operators.

The feature of locking the register by the actuator to prevent accidental movement by causing the engagement of the pallets with substantially parallel sides of the wheel-teeth is particularly desirable in registers for voting-machines, where the prevention of the unauthorized movement of the register is a practical necessity, and also the construction by means of which all of the wheels may when desired be reset by the simple reversal of the units-wheel when the actuator is out of engagement therewith is an advantageous feature in machines of that type. In the construction shown the palleted wheel 9 is connected directly with the units-wheel of the register; but I do not desire to confine my invention to this construction, as the connection between the two could be more remote, if desired.

This application is a division of my prior application, Serial No. 658,738, filed November 18, 1897.

I claim as my invention—

1. In a register, the combination with the arbor having the operating-wheel thereon, the units-wheel secured to the arbor, the numbered wheels or disks on the arbor, and transferring-gearing between them, the stop for engaging the wheel of highest denomination and arresting it and all the other wheels at zero successively.

2. In a register, the combination with the arbor, the units-wheel secured thereon, the numbered wheels or disks loose on the arbor, and transferring-gearing between them, a stop yielding in one direction and adapted to engage the wheel of highest denomination and arrest it and all the other wheels at zero successively when the arbor is turned backward.

3. In a register, the combination with the units-wheel, the numbered wheels or disks, and transferring-gearing between them for causing their intermittent movement, a stop adapted to yield in one direction and to engage the wheel of highest denomination and arrest it and the other wheels at zero successively when the wheel of lowest denomination is turned backward.

4. In a register, the combination with the arbor having the units-wheel secured thereto and the numbered wheels or disks loose on the arbor, transferring-gearing between the wheels, the stop for engaging the wheel of highest denomination and arresting it and all the other wheels at zero successively, and a toothed actuating-wheel, of the reciprocatory actuator having pallets thereon adapted to cooperate with the teeth of the actuating-wheel.

5. In a register, the combination with the units-wheel capable of rotation in both directions, the numbered wheels or disks and transferring-gearing between said wheels and the units-wheel, of a stop for arresting the backward rotation of the numbered wheel of highest denomination, whereby all the numbered wheels may be returned to zero successively by rotating the units-wheel backward.

6. In a register, the combination with the toothed actuating-wheel, the units-wheel connected thereto, the numbered wheels and transferring-gearing between them, of an actuator having pallets adapted to engage the actuating-wheel successively and capable of movement to disengage both pallets from the wheel, whereby the latter and the train of wheels may be turned back to zero and a stop for arresting the wheels at zero when turned backward.

7. In a register, the combination with the toothed actuating-wheel, the units-wheel connected thereto, the numbered wheels and transferring-gearing between them, of a reciprocatory actuator, having oppositely-arranged pallets thereon adapted to engage the teeth on opposite sides of the wheel alternately and separated sufficiently to permit the independent movement of the actuating-wheel, whereby the latter and the numbered wheels may be rotated backwardly to zero and a stop for arresting the wheels at zero when turned backward.

8. In a register, the combination with a train of numbered wheels, and an actuating-wheel therefor provided with teeth inclined on one side and having the recesses at the inner end thereof, of an actuator for said wheel having oppositely-arranged pallets thereon adapted to engage the teeth and recesses on the wheel and lock it from rotation.

9. In a register, the combination with a toothed actuating-wheel, of a movable actuator arranged at the side of the wheel consisting of a plate of flat metal having the pallets cut from the metal and bent out at the side thereof and adapted to engage the teeth on the wheel alternately.

10. In a register, the combination with a toothed actuating-wheel, of a reciprocatory actuator consisting of a flat metal plate arranged at the side of the wheel and having the integral pallets cut therefrom and bent laterally from the plate to engage the teeth of the wheel alternately.

11. In a register, the casing formed of sheet metal bent into channel form having the two parallel sides and apertures in the rear face and guides formed on one of the sides for an actuator, transverse shafts extending between the sides of the casing, a train of wheels on the shafts having numerals on their peripheries visible through the apertures in the casing and a toothed actuating-wheel therefor, of a reciprocatory actuator having the pallets formed on one side thereof to engage the actuating-wheel and guided to move in right lines in the guides on the side of the casing.

12. In a register, the combination with the casing formed of a single piece of sheet metal and embodying the side plate having the guiding-lugs thereon and the front plate having a perforation for the actuator, the numbered wheels and the toothed actuating-wheel and a shaft supporting said wheels, of the reciprocatory actuator operating in the guides in the casing having an elongated aperture through which the shaft extends to support the actuator and the laterally-extended pallets on the latter coöperating with the actuating-wheel.

13. The combination with a frame, a register having a train of numbered wheels supported therein and a reciprocatory actuator for the register, of a support, means for causing the relative movement of the support and register-frame, an actuator-operating device movable upon the support and having a projection for normally engaging the actuator to operate it in one direction, and a second projection or abutment adapted to be moved into position to engage the actuator and to operate it in the opposite direction when the register-frame and support are moved relatively.

14. The combination with a frame, a plurality of registers thereon, each embodying numbered wheels, a toothed actuating-wheel, and palleted actuators adapted to engage and rotate the wheels when moved in opposite directions, of a support, means for causing a relative movement between the support and register-frame, a plurality of projections on the support in engagement with the actuators to cause a relative movement between them and the actuating-wheels and a plurality of engaging surfaces on the support adapted to be moved into and out of engagement with the register-actuators to cause the latter to move the actuating-wheel when the frame and support are moved relatively to each other.

15. The combination with the register-frame, a register thereon having an actuator provided with the slot, of a support movable relatively to the register-frame, an arm movable on the support having the extension entering the slot in the actuator, and the shoulder for engaging the end thereof.

16. The combination with a support, a channeled frame having guides, arbors on the frame, and the registering-wheels on the arbors, the units-wheels having the teeth, and the palleted actuators sliding in the guides in the frame, of stops or shoulders with which the actuators are adapted to engage said support, and stops being relatively movable to cause the actuation of the registers.

17. The combination with a register embodying à train of wheels, an arbor for said wheels, and the units-wheel having the teeth, of a support for said register, an actuator movable in rigid guides having the oppositely-arranged teeth or pallets for alternately engaging the teeth of the units-wheel, a support, devices thereon for positively engaging the actuator, and means independent of said devices for causing the relative movements of the last-mentioned support and the register-support to cause the positive movement of the register-actuator in opposite directions.

18. The combination with the register embodying the train of wheels, and a units-wheel having the teeth, of a sliding actuator having the oppositely-arranged pallets for engaging the teeth and the slot, a movable member having the finger projecting in the slot and the shoulder, and means for moving the member and register-casing relatively.

19. The combination with a register-support, a register thereon embodying an actuator operating positively in both directions and having a slot, of a support, a member pivoted on the support having a shoulder or abutment to engage the actuator, and a curved finger projecting into the slot therein, said last-mentioned support and register-support being relatively movable.

20. The combination with a train of numbered wheels, and a toothed actuating-wheel, an actuator therefor adapted to lock the actuating-wheel positively when in either of two positions, of a movable member adapted, when moved in one direction, to engage the actuator to hold it stationary relatively to the register, and means for reciprocating the register relatively to said member to operate it.

21. In a register, the combination with a train of numbered wheels, a toothed actuating-wheel, an actuator therefor adapted to operate said wheel and to lock it positively when at the extremes of its motion in either direction, of a support, a movable member thereon for engaging the actuator to hold it stationary relatively to the register, and means for moving the register relatively in opposite directions to the actuator.

22. The combination with a register embodying a train of numbered wheels, an actuating-wheel and an actuator therefor, of a manually-operated member freely movable into and out of engagement with the actuator but incapable of causing a manual operation thereof and independent mechanism for moving the member and register relatively to operate the register.

23. The combination with a register and an actuator therefor, of a movable member adapted to be manually set or placed for operation upon the actuator and to be moved out of coöperative relation therewith, means for moving the member and register independently of said movable member to cause the operation of the register when the parts are moved relatively from normal to an abnormal position and returned to normal position again to complete the operation of the register.

24. The combination with a register embodying numbered wheels, a reciprocatory actuator operative to move the register one number by the reciprocation of the actuator in opposite directions, of a movable member adapted to be moved into coöperative relation with the actuator without operating it, and means for causing the complete reciprocation of the actuator only when coöperating with the member.

25. The combination with a train of numbered wheels, of an actuator therefor adapted to advance the register one complete unit at each reciprocation, of an adjustable member normally in engagement with the actuator to operate it in one direction and adapted to be manually adjusted to coöperate with the actuator when the latter is moved in the other direction and mechanism independent of the movable member for causing the relative movements of the register and member to cause the actuator to operate the register.

26. The combination with a frame, a register thereon embodying a train of numbered wheels and an actuator therefor, of a support, a rotary oscillatory member having a finger adapted to engage the actuator to move it in one direction and provided with a shoulder in rear of the finger capable of manual operation into the path of the actuator to limit its movement in the other direction, and mechanism for causing a relative movement of the register-frame and support.

27. The combination with a support, of a member pivoted thereon consisting of the angular plate 40 provided with the shoulder 42 and the finger 41 adapted to coöperate with a register-actuator.

ALFRED J. GILLESPIE.

Witnesses:
G. WILLARD RICH,
G. A. RODA.